Figure 1:
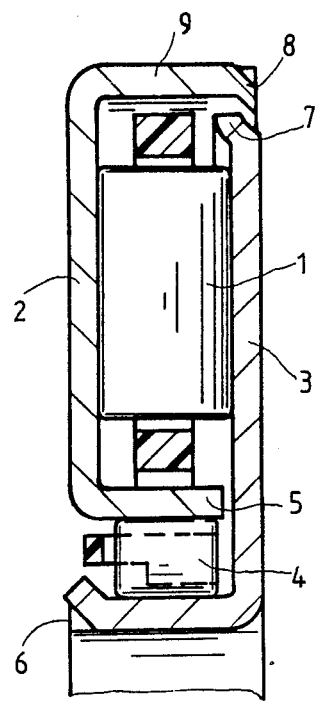

United States Patent [19]
Muntnich et al.

[11] Patent Number: 4,971,460
[45] Date of Patent: Nov. 20, 1990

[54] AXIAL-RADIAL ROLLING BEARINGS

[75] Inventors: Leo Muntnich, Aurachtal; Hellmut Adler, Herzogenaurach; Ernst Mayer, Grossenseebach, all of Fed. Rep. of Germany

[73] Assignee: INA Walzlager Schaeffler KG, Fed. Rep. of Germany

[21] Appl. No.: 503,290

[22] Filed: Apr. 2, 1990

[30]     Foreign Application Priority Data

May 20, 1989 [DE]   Fed. Rep. of Germany ... 8906246[U]

[51] Int. Cl.$^5$ ............................................. F16C 19/00
[52] U.S. Cl. ..................................... 384/452; 384/455
[58] Field of Search ............... 384/452, 455, 620, 453, 384/454, 622

[56]        References Cited
U.S. PATENT DOCUMENTS

| | | | |
|---|---|---|---|
| 3,930,692 | 1/1976 | Condon et al. | 384/455 |
| 3,934,956 | 1/1976 | Pitner | 384/455 |
| 4,512,729 | 4/1985 | Sakamoto et al. | 384/452 |
| 4,861,171 | 8/1989 | Adachi | 384/620 |

*Primary Examiner*—Lenard A. Footland
*Attorney, Agent, or Firm*—Bierman and Muserlian

[57]           ABSTRACT

An axial-radial rolling bearing comprising a first row of rolling elements which, for the absorption of axial forces are arranged between plane-parallel raceways of two race discs and a second row of rolling elements which, for the absorption of radial forces are arranged between flanges extending essentially axially and formed at adjacent peripheral edges of the race discs, characterized in that the flanges extend in different axial directions and overlap each other over at least a part of their length, the two rows of rolling elements being arranged radially one above the other substantially in one plane.

5 Claims, 1 Drawing Sheet

U.S. Patent   Nov. 20, 1990   4,971,460

AXIAL-RADIAL ROLLING BEARINGS

STATE OF THE ART

Axial-radial rolling bearings comprising a first row of rolling elements which, for the absorption of axial forces are arranged between plane-parallel raceways of two race discs and a second row of rolling elements which, for the absorption of radial forces are arranged between flanges extending essentially axially and formed at adjacent peripheral edges of the race discs are known, i.e. from FR-A No. 25 13 334. The known construction, however, has the disadvantage that the rolling element arrangement shown requires a large design space in the axial direction which is not available in all mounting set-ups. A further disadvantage is that the race discs and the rows of rolling elements are not connected with one another which makes not only the transportation of the unmounted bearing considerably more difficult, but also its mounting.

OBJECTS OF THE INVENTION

It is an object of the invention to provide an axial-radial rolling bearing which has a small space requirement and which is easy to handle both during transportation and during mounting.

This and other objects and advantages of the invention will become obvious from the following detailed description.

THE INVENTION

The novel axial-radial rolling bearing of the invention comprising a first row of rolling elements which, for the absorption of axial forces are arranged between plane-parallel raceways of two race discs and a second row of rolling elements, which for the absorption of radial forces are arranged between flanges extending essentially axially and formed at adjacent peripheral edges of the race discs, is characterized in that the flanges extend in different axial directions and overlap each other over at least a part of their length, the two rows of rolling elements being arranged radially one above the other substantially in one plane.

The flanges extend in different axial directions and overlap each other over at least a part of their length, the two rows of rolling elements being arranged radially one above the other substantially in one plane. By this measure, the axial design space can be considerably reduced without having the problem of transportation losses.

A further development of the invention provides that cylindrical rolling elements are arranged in both rolling element rows. Such a construction is advantageous in applications where relatively high forces have to be absorbed both axially as well as radially. In this case too, it is possible to form a ready-to-mount structural unit by simple means.

One advantageous development of the invention provides that in the row of rolling elements which absorbs radial forces, balls are arranged which roll in ball grooves formed in the flanges. By the proposed measure, not only a design space reduction is achieved but, in a particularly simple manner, also a structural unit by which especially the mounting is substantially simplified. A particularly advantageous development of the invention provides a construction in which the race discs are formed from sheet metal parts fabricated by a non-cutting procedure. In such race discs, the ball grooves can be rolled round in a particularly simple manner.

Finally, the invention provides that at least one of the race discs comprises an axially directed flange or collar at the peripheral edge away from the flanges. Even with the arrangement of cylindrical rolling elements in both the rolling element rows, such an embodiment permits the forming of a structural unit in a simple manner or enables the race disc provided with the collar to be centered or to be fixed in a bore by means of the collar.

REFERRING NOW TO THE DRAWINGS

Figure 2:
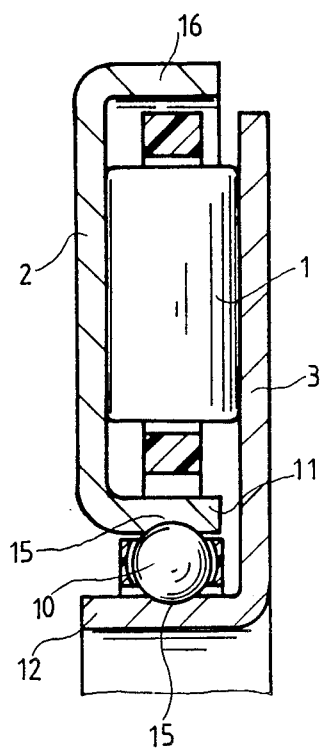
Figure 3:
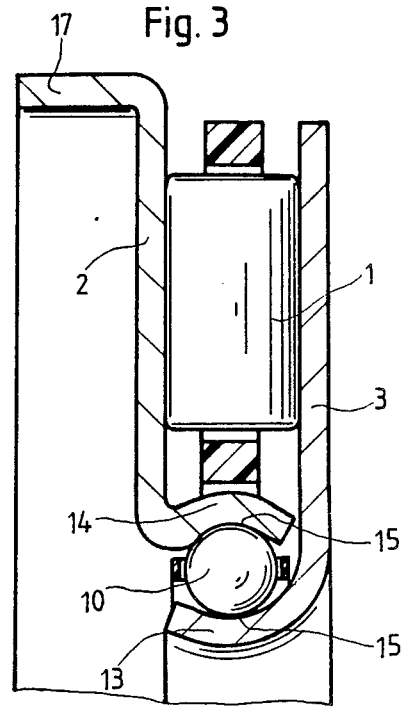

FIGS. 1 to 3 show different examples of embodiments of an axial-radial bearing of the invention in partial longitudinal section.

The axial-radial bearing of the invention as represented in FIGS. 1 to 3 comprises a first row of cylindrical rolling elements 1 which, for the absorption of axial forces are arranged between plane-parallel raceways of two race discs 2 and 3.

According to FIG. 1, cylindrical rolling elements 4 are likewise arranged for the absorption of radial forces and roll on axially extending flanges 5 and 6 formed at adjacent peripheral edges of the race discs 2 and 3. The flanges 5 and 6 extend in different axial directions and overlap each other over their full length. The rolling element rows of the cylindrical rolling elements 1 and 4 are arranged radially one above the other and in one plane.

For forming a structural unit, the race disc 3 is drawn in axially at its edge 7 turned away from the flange 6 and engaged by lugs or a circumferential edge 8 formed at an axially directed flange 9 of the race disc 2. The free end of the flange 6 likewise has a circumferential edge which engages over the rolling elements 4.

In the example of the embodiment of FIGS. 2 and 3, balls 10 are arranged in the row of rolling elements which absorbs radial forces, which balls 10 roll in ball grooves 15 formed in the flanges 11 and 12, and 13 and 14 respectively. In these examples of embodiments as well, the flanges 11 and 12, and 13 and 14 respectively, extend in different axial directions and the cylindrical rolling elements 1 and the balls 10 are likewise arranged radially in one plane.

Since the race discs 2 and 3 are formed From sheet metal discs made by a non-cutting procedure, the flanges 11 and 12, and 13 and 14 respectively, possess such an elasticity that for forming a structural unit, they can be snapped axially over the balls 10. While the race disc 2 according to FIG. 2 is likewise provided with a flange 16 at its peripheral edge away from the flange 11, at the race disc 2 of FIG. 3, an axially directed collar 17 turned away from the bearing is formed.

Various modifications of the bearings of the invention may be made without departing from the spirit or scope thereof and it is to be understood that the invention is intended to be limited only as defined in the appended claims.

What I claim is:

1. An axial-radial rolling bearing comprising a first row of rolling elements which, for the absorption of axial forces are arranged between plane-parallel raceways of two race discs and a second row of rolling elements which, for the absorption of radial forces are arranged between flanges extending essentially axially and formed at adjacent peripheral edges of the race discs, characterized in that the flanges extend in different axial directions and overlap each other over at least a part of their length, the two rows of rolling elements being arranged radially one above the other substantially in one plane.

2. An axial-radial rolling bearing of claim 1 wherein cylindrical rolling elements are arranged in both rows of rolling elements.

3. An axial radial rolling bearing of claim 1 wherein balls are arranged in the row of rolling elements which absorbs radial forces which roll in ball grooves formed in the flanges.

4. An axial-radial rolling bearing of claim 1 wherein the race discs are formed from sheet metal parts made by a non-cutting procedure.

5. An axial-radial rolling bearing of claim 1 wherein at least one of the race discs is provided at its peripheral edge turned away from the flanges with an axially directed flange or collar.

* * * * *